US010286476B2

(12) United States Patent
Wendt et al.

(10) Patent No.: US 10,286,476 B2
(45) Date of Patent: May 14, 2019

(54) ADDITIVE MANUFACTURING OF A COMPONENT MADE FROM A METAL MATRIX COMPOSITE

(71) Applicant: Airbus Operations GmbH, Hamburg (DE)

(72) Inventors: Christiane Wendt, Hamburg (DE); Thorsten Michael Wienberg, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 283 days.

(21) Appl. No.: 15/239,489

(22) Filed: Aug. 17, 2016

(65) Prior Publication Data

US 2017/0050271 A1 Feb. 23, 2017

(30) Foreign Application Priority Data

Aug. 18, 2015 (DE) .......................... 10 2015 113 677

(51) Int. Cl.
*B23K 9/16* (2006.01)
*B33Y 10/00* (2015.01)
(Continued)

(52) U.S. Cl.
CPC ............ *B23K 9/162* (2013.01); *B22F 3/1055* (2013.01); *B22F 7/06* (2013.01); *B23K 9/044* (2013.01); *B23K 9/232* (2013.01); *B23K 26/0846* (2013.01); *B23K 26/123* (2013.01); *B23K 26/127* (2013.01); *B23K 26/34* (2013.01); *B33Y 10/00* (2014.12); *B33Y 30/00* (2014.12); *C22C 47/025* (2013.01); *C22C 47/14* (2013.01); *B23K 2101/006* (2018.08); *B23K 2103/16* (2018.08); *B23K 2103/172* (2018.08); *B23K 2103/18* (2018.08); *C22C 47/08* (2013.01); *Y02P 10/295* (2015.11)

(58) Field of Classification Search
CPC ........ B23K 9/162; B23K 9/044; B23K 9/232; B23K 26/0846; B23K 26/123; B23K 26/127; B23K 26/34; B23K 2201/006; B23K 2203/16; B23K 2203/18; B33Y 10/00; B33Y 30/00
See application file for complete search history.

(56) References Cited

U.S. PATENT DOCUMENTS 6,064,031 A 5/2000 Talwar
2014/0050921 A1* 2/2014 Lyons ...................... B32B 5/16
428/372

FOREIGN PATENT DOCUMENTS

DE 10215999 A1 10/2003
DE 102010049195 B4 11/2012

OTHER PUBLICATIONS

Machine Translation of Ehinger (DE 10 2010 049195), 2010, performed Jul. 2018.*

(Continued)

*Primary Examiner* — Brian W Jennison
(74) *Attorney, Agent, or Firm* — Lorenz & Kopf LLP

(57) ABSTRACT

The embodiments relate to a method for additive manufacturing of a component made from a metal matrix composite for a vehicle. In a step of the method, a plurality of elongated filaments is provided. In another step, metallic powder is provided. In a further step, the metal matrix composite component is additively manufactured by melting the metallic powder.

9 Claims, 2 Drawing Sheets

(51) Int. Cl.
*B33Y 30/00* (2015.01)
*B23K 9/04* (2006.01)
*B23K 26/12* (2014.01)
*B23K 9/23* (2006.01)
*B23K 26/08* (2014.01)
*B23K 26/34* (2014.01)
*B22F 3/105* (2006.01)
*B22F 7/06* (2006.01)
*C22C 47/02* (2006.01)
*C22C 47/14* (2006.01)
*B23K 101/00* (2006.01)
*B23K 103/16* (2006.01)
*C22C 47/08* (2006.01)
*B23K 103/18* (2006.01)

(56) References Cited

OTHER PUBLICATIONS

German Patent Office, German Search Report for German Patent Application No. 10 2015 113 677.5 dated May 23, 2016.
German Patent Office, German Office Action for German Patent Application No. 102015113677.5 dated Jul. 12, 2018, 5 pages.

\* cited by examiner

ADDITIVE MANUFACTURING OF A COMPONENT MADE FROM A METAL MATRIX COMPOSITE

CROSS-REFERENCE TO RELATED APPLICATION

This application claims priority to German Patent Application No. 102015113677.5, filed Aug. 18, 2015, which is incorporated herein by reference in its entirety.

TECHNICAL FIELD

The embodiments herein relate to additive manufacturing of components of vehicles. In particular, the invention relates to a method for additive manufacturing of a metal matrix composite component and a manufacturing apparatus for performing the method for additive manufacturing of a metal matrix composite component.

BACKGROUND

In addition, other objects, desirable features and characteristics will become apparent from the subsequent summary and detailed description, and the appended claims, taken in conjunction with the accompanying drawings and this background.

Additive manufacturing processes, also known as "three-dimensional (3D) printing", enable the production of e.g. plastic or metal objects, which are designed beforehand on the computer in form of CAD data. The additive manufacturing of a large metallic structural component of a vehicle, such as a bionic fin of an aircraft may be time-consuming.

SUMMARY

There may be a need to provide an improved method and an improved apparatus for additive manufacturing of a metallic component of a vehicle.

This need is solved by the subject-matter of the independent claims. Exemplary embodiments will be apparent from the dependent claims and the following description.

According to an aspect of the invention, a method is provided for additive manufacturing of a component made from a metal matrix composite. The method may comprise several steps. In step a) of the method, a plurality of elongated filaments is provided. In a further step b) of the method, metal powder is provided. Furthermore, in a further step c) of the method, additive manufacturing of the metal matrix composite by melting the metal powder is provided.

Metal matrix composites can be made of a continuous metal matrix having a discontinuous ceramic or organic reinforcement in its interior, e.g. in the form of fibers or whiskers. The metal-matrix composites may include, e.g. reinforced aluminum, titanium, and other reinforced metal materials.

The term "filament" is understood as a generic term for an elongated, possibly quasi-endless object. A filament may comprise, for example, fibers and filaments. Depending on the application, the diameter of the filament may vary e.g. from less than one centimeter (e.g., 0.5 centimeter) to several centimeters (e.g., 10 centimeters).

The metal powder that can be used in the additive manufacturing, may be selected suitably depending on the application. For metal powders, metals such as tool-steel or stainless steel, aluminum or titanium, may be used. Other examples may be metal alloys, such as e.g. aluminum forging alloys, titanium alloys and magnesium alloys. The aluminum forging alloys may be made of e.g. pure aluminum, copper, manganese, silicon, magnesium, zinc, magnesium and silicon. The titanium alloys may comprise, for example, alpha-titanium alloys, beta titanium alloys, alpha-beta titanium alloys, titanium aluminides. The magnesium alloys may comprise e.g. magnesium-aluminum-manganese (Mg—Al—Mn), magnesium-aluminum-zinc (Mg—Al—Zn), magnesium-zinc-zirconium (Mg—Zn—Zr), magnesium-rare earth metal-zirconium (Mg-E-Zr), magnesium-rare earth metal-zinc-silver (Mg—Ag—Zn-E) (with or without thorium), or magnesium-thorium zirconium on (Mg—Th—Zr).

During the additive manufacturing, the metal powder, which is currently needed, is liquefied completely, e.g. by a laser. Once it has cooled, the material solidifies. Thereby, the component is built up layer by layer: This is done by the lowering of the building platform, repeatedly applying metal powder and subsequently renewed melting. Examples of additive manufacturing processes are e.g. Selective Laser Sintering (SLS), Selective Laser Melting (SLM) and Electron Beam Melting (EBM).

By the use of the elongated filaments, the method can provide a resulting product with controlled and predictable porosity. This may help to determine the behavior of components and the component properties. Also large-sized components of a vehicle can be produced by additive manufacturing processes. For example, a desired (theoretically infinite) length of the component may be formed. In other words, even large-sized metallic components can benefit from the advantages of additive manufacturing, such as a significantly larger design freedom and weight savings, which e.g. are important for aircraft structural components. Furthermore, the production rate may be improved in comparison to the additive manufacturing with only metal powder or wire or star-shaped construction materials. This may reduce the manufacturing time and the manufacturing costs. With the additive manufacturing, only a part of the elongated filaments is melted, so that the total energy requirement can be reduced as well as the distortion due to thermic shrinking. It should be noted that the method for additive manufacturing may not only be used for structural components of an aircraft, but also for components of ground-based vehicles, i.e. land vehicles and watercrafts.

According to an embodiment, at least one of the elongate filaments is a metal filament, a metal-coated non-metallic filament, a semi-metallic filament or a polymer fiber.

A metal filament may be e.g. a filament made of different metals, such as aluminum, titanium, tool-steel, etc. Also, the above-mentioned metal alloys can be used for this purpose. The metallic filaments may be made of the same metal material as the metal powder.

A metal-coated non-metallic filament is e.g. an aluminum-coated ceramic filament.

A semi-metallic filament is partially made of metals. For example, a semi-metallic filament may contain 30% to 65% of metal (steel, iron, copper, brass, etc.) mixed with non-metal (graphite, fillers and binders etc.).

A polymer fiber is produced by polymerization, addition or condensation and basically comprises chainlike arranged macromolecules.

Accordingly, with the aid of elongated metallic or at least conductive filaments, components made of different materials can be manufactured.

According to an embodiment, a powder bed of metal powder is provided. At least a part of the elongate filaments is disposed on the powder bed for additive manufacturing. In step c) the metal powder is scanned in a scan direction e.g. with a laser beam to achieve melting and at least to fuse a part of elongated filaments with each other, thereby to selectively fuse the metal powder or a part of the elongated filaments into a desired shape.

According to an embodiment, the powder bed is located within a manufacturing apparatus. The manufacturing apparatus comprises at least one opening that is suitable for receiving the elongated filaments. During the additive manufacturing, the elongated filaments are moved along a moving direction transversely to the scanning direction, whereby a desired length of the component is formed.

The manufacturing apparatus may be transported to any location. The manufacturing apparatus may therefore also be referred to as a mobile manufacturing unit. It is also possible to realize an (theoretical) infinite length of a component by moving the elongated filaments through the manufacturing apparatus.

According to an embodiment, a chemically inert atmosphere is provided inside the manufacturing apparatus.

For example, inert gases can be used. The inert gases comprise, for example, nitrogen and any inert gases (helium, neon, argon, krypton, xenon, radon). As a result, the oxygen content can be reduced within the manufacturing device or completely replaced so that corrosion damage can be avoided. Furthermore, an explosion or the propagation of incineration can be also prevented.

According to an embodiment, the additive manufacturing is a laser-based additive manufacturing or arc-based additive manufacturing.

Examples of a laser-based additive manufacturing are Selective Laser Sintering or Selective Laser Melting. For example, the building material, such as metal powder and elongated filaments, may be completely melted by Selective Laser Melting at the machining point of the workpiece. The hardening of the material is carried out with the cooling process. Thus, the construction object is built up layer by layer.

In the electric-arc-based additive manufacturing, metal powder and parts of the elongated filaments are sintered layer by layer with an electron beam to create the structure.

According to an embodiment, the elongated filaments comprise a round or polygonal cross-section.

A polygonal cross-section may be, for example, triangular, rectangular, diamond-shaped, or pentagonal.

According to a further aspect of the invention, a manufacturing apparatus is provided for additive manufacturing of a metal matrix composite component with a plurality of elongated filaments. The manufacturing apparatus comprises a powder bed and a heat source. The powder bed provides metal powders. The heat source is configured to melt the metal powder for additive manufacturing of the component in order to selectively fuse the metal powder and the elongated filament into a desired shape.

The heat source may be e.g. a laser, such as a CO2 laser. Instead of a laser, an electron beam or an electric arc may also be used.

With such manufacturing apparatus, it is possible to manufacture large-sized components of a vehicle as well as to save on the manufacturing time. By using the elongated filaments, a theoretically unlimited length or a desired length of the component can be manufactured. For example, stringers of an aircraft may be manufactured by the manufacturing apparatus.

According to an embodiment, the manufacturing apparatus comprises at least one opening that is suitable for receiving the elongated filaments.

Accordingly, components of a vehicle can be made with a desired length. The reception of the elongated filaments may be carried out e.g. by the feed rollers.

According to an embodiment, the manufacturing apparatus further comprises a manufacturing chamber, in which the metal powder is melted and in which there is a chemically inert atmosphere.

The chemically inert atmosphere may at least reduce the corrosion damage.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
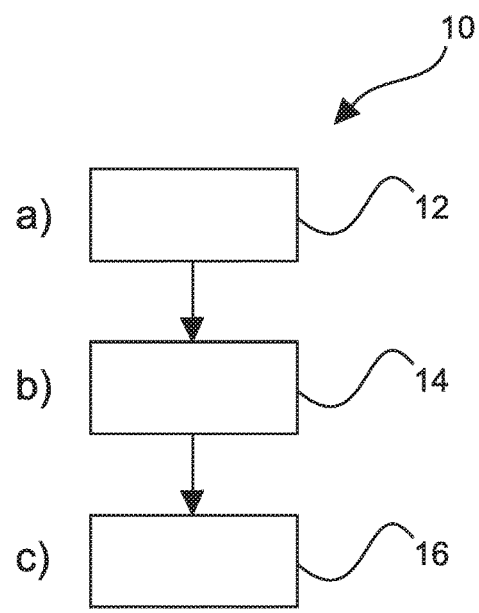
FIG. 1 shows a flow diagram of a method for additive manufacturing of a metal matrix composite component of a vehicle.

FIG. 1 shows a flowchart 10 of a method for additive manufacturing of a component of a metal matrix composite for a vehicle. The method comprises several steps that are described below. However, it should be noted that the method may also comprise further steps, which are not explicitly mentioned.

In step 12 of the method, a plurality of elongated filaments is provided. At least one of the elongate filaments may e.g. be a metal filament, a metal-coated non-metallic filament, a semi-metallic filament or a polymer fiber. In other words, an elongated filament may at least partly be made of metal, such as tool-steel or stainless steel, aluminum or titanium. The cross-section of an elongated filament is e.g. round or polygonal. Depending on the application, the diameter may also vary, such as less than 1 centimeter or a few centimeters (e.g., 5 cm).

In step 14 of the method, metal powder is provided. Again, depending on the application, in principle different metals, such as tool-steel or stainless steel, aluminum or titanium, may be used. Metal alloys, such as aluminum forging alloys, titanium alloys or magnesium alloys, may also be used. The metal powder and the elongated filaments may be made of the same metal. The volume ratio between the elongate filaments, and the metal powder may also be different depending on the component to be manufactured. In one example, the volume ratio between the elongate filaments, and the metal powder may be about at 4:1. In another example, the volume ratio between the elongate filaments, and the metal powder may be 5:1.

In step 16 of the method, additive manufacturing of the metal matrix composite component is performed by melting the metal powder. The additive manufacturing can be e.g. a laser-based additive manufacturing or an electric-arc-based additive manufacturing method. In other words, additive manufacturing processes can be realized by applying and solidifying the metal in a solid state in layers on a carrier medium. The connection can be made by melting using a laser or an arc welding. The power of the heat source can be adapted to allow for a low porosity.

By using the elongated filaments, a large-size component of a vehicle can be manufactured. An example is an aircraft stringer. The production time and manufacturing costs can also be reduced.

The first step 12 is also referred to as step a), the second step 14 as step b), and the third step 16 as step c).

Figure 2:
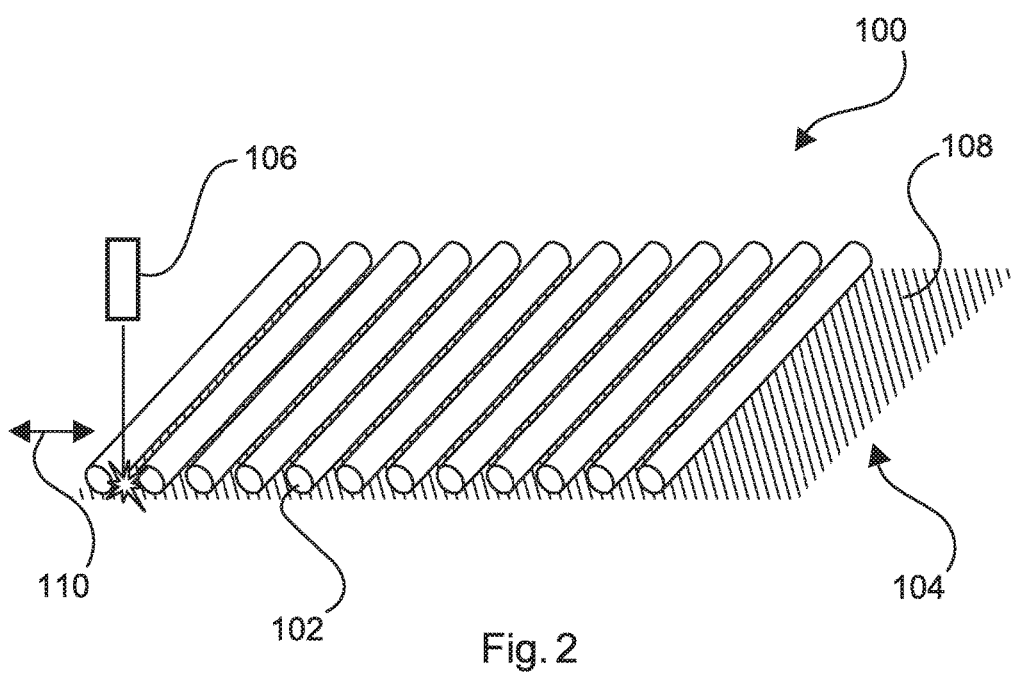
FIG. 2 shows a perspective view of an example of a manufacturing apparatus.

FIG. 2 shows a perspective view of an example of a manufacturing apparatus 100 for additive manufacturing of a metal matrix composite component with a plurality of elongated filaments 102. The manufacturing apparatus 100 comprises a powder bed 104 and a heat source 106. The powder bed 104 provides metal powder 108. The heat source 106 is configured to melt the metal powder 108 for additive manufacturing of a component in order to selectively fuse the metal powder 108 with the elongate filaments 102 into a desired shape.

Figure 3:
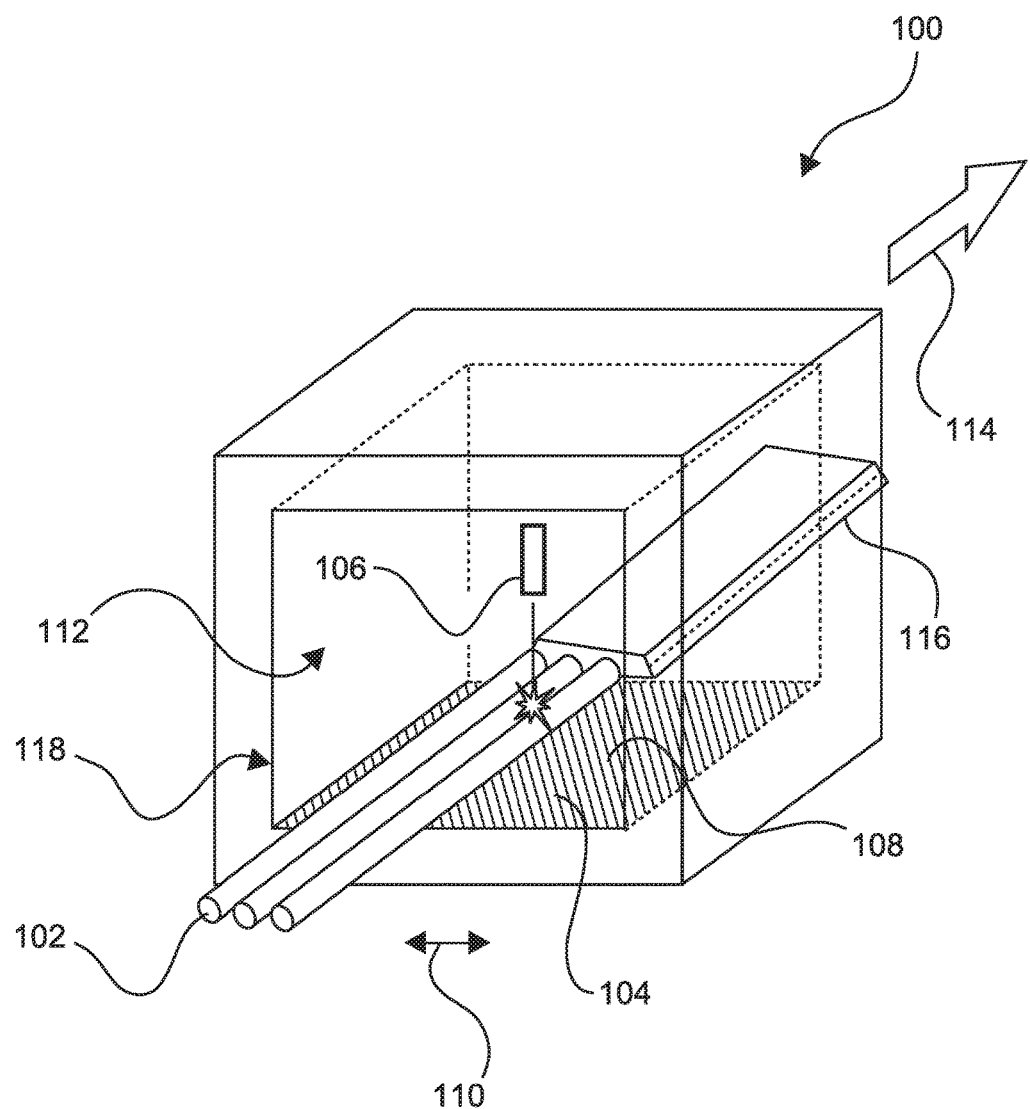
FIG. 3 shows a perspective view of another example of a manufacturing apparatus.

The manufacturing apparatus may be closed, that is, the elongated filaments to be manufactured can be accommodated in the manufacturing apparatus during additive manufacturing and the manufactured component can only be removed after the additive manufacturing process. It is also possible that the manufacturing apparatus is open. In other words, during the additive manufacturing process further elongated filaments to be manufactured can be introduced into the manufacturing apparatus and the manufactured component can also be removed. An example of an open manufacturing apparatus is shown in FIG. 3.

In the additive manufacturing, at least a portion of the elongate filaments 102 is disposed on the powder bed 104. The metal powder is scanned in a scanning direction 110 to achieve a melting and to connect at least a part of elongated filaments 102 with each other, and thereby selectively fuse the metal powder 108 into a desired shape.

A laser-based additive manufacturing or an electric-arc-based additive manufacturing method may be used. In other words, the heat source 106 may be e.g. a laser or an electric arc. The metal powder may also be fused by other methods.

The porosity of the solidified material depends on the size of the energy supplied. A rough classification depending on the use of a laser or an electric arc for solidifying the metal powder can be made. The power of the heat source can be adapted to allow for a low porosity.

FIG. 3 shows a perspective view of another example of a manufacturing apparatus 100. The manufacturing apparatus 100 comprises at least one opening 112 that is adapted to receive the elongated filaments 102.

In this manner, the elongated filaments 102 can be moved during the additive manufacturing along a moving direction 114 transverse to the scanning direction 110. Accordingly, a desired length of the component can be produced. For example, FIG. 3 shows a manufactured component 116.

Furthermore, the manufacturing apparatus 100 comprises a manufacturing chamber 118. In the manufacturing chamber 118, the metal powder is melted and a chemically inert atmosphere prevails. Inert gas such as e.g. nitrogen may be introduced into the manufacturing chamber 118. The openings 112 of the manufacturing chamber 118 can be hermetically sealed. Corrosion damages may thus be avoided.

The above-described embodiments can be combined in different ways. In particular, aspects of the method can be used for embodiments of the devices and use of the devices and vice versa.

In addition, it shall be noted that the terms such as "comprising", "including" or similar do not exclude further elements or steps and that the article "a" or "an" does not exclude the presence of a plurality of objects. It is further noted that features or steps, which have been described with reference to one of the above embodiments, can also be used in combination with features or steps of other above described embodiments. Reference signs in the claims shall not restrict the scope of the invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for additively manufacturing of a component made from a metal matrix composite for a vehicle, the method comprising the steps of:
providing metal powder as a powder bed in a manufacturing apparatus;
disposing a plurality of elongated filaments on the powder bed, such that the elongated filaments are elongated along a moving direction; and
melting the metal powder, with a laser beam that scans the metal powder in a scanning direction, while moving the elongated filaments along the moving direction, wherein the moving direction is transverse to the scanning direction, to form the metal matrix component.

2. The method of claim 1, wherein at least one of the elongated filaments is a metal filament, a metal-coated non-metallic filament, a semi-metallic filament or a polymer fiber.

3. The method of claim 1,
wherein the metal powder is scanned by the laser beam in the scanning direction to achieve melting and to fuse at least a part of said elongated filaments with each other and thereby to selectively melt the metal powder into a desired shape.

4. The method of claim 3,
wherein the powder bed is disposed within a manufacturing device;
wherein the manufacturing device comprises at least one opening suitable for receiving the elongated filaments; and
wherein the elongated filaments are moved along the moving direction transverse to the scanning direction, whereby a desired length of the component is formed.

5. The method of claim 4, wherein a chemically inert atmosphere is provided within the manufacturing device.

6. The method of claim 1, wherein the elongated filaments have a round or polygonal cross-section.

7. A manufacturing apparatus for additive manufacturing of components made from a metal matrix composite with elongated filaments, comprising:
a powder bed comprising a metallic powder;
a feed to dispose a plurality of elongated filaments on the powder bed, such that the elongated filaments are elongated along a moving direction; and
a heat source comprising a movable laser beam having a scanning direction;

wherein the heat source is configured to melt the metal powder with the laser beam by scanning the metallic powder in the scanning direction while the elongated filaments are moved along the moving direction, wherein the moving direction is transverse to the scanning direction, to selectively fuse the metallic powder with the elongated filaments into a desired shape.

8. The manufacturing apparatus according to claim 7, wherein the manufacturing apparatus comprises at least one opening which is suitable for receiving the elongated filaments.

9. The manufacturing apparatus according to claim 7, further comprising:
   a manufacturing chamber, in which the metallic powder is melted and in which there is a chemically inert atmosphere.

\* \* \* \* \*